M. J. LYNCH.
AUTOMATIC SAW SET.
APPLICATION FILED MAY 15, 1913.

1,092,657.

Patented Apr. 7, 1914.

2 SHEETS—SHEET 1.

Witnesses

Inventor
Michael J. Lynch
By Joseph A. Miller
Attorneys

M. J. LYNCH.
AUTOMATIC SAW SET.
APPLICATION FILED MAY 15, 1913.
1,092,657.
Patented Apr. 7, 1914.
2 SHEETS—SHEET 2.
Fig. 4.
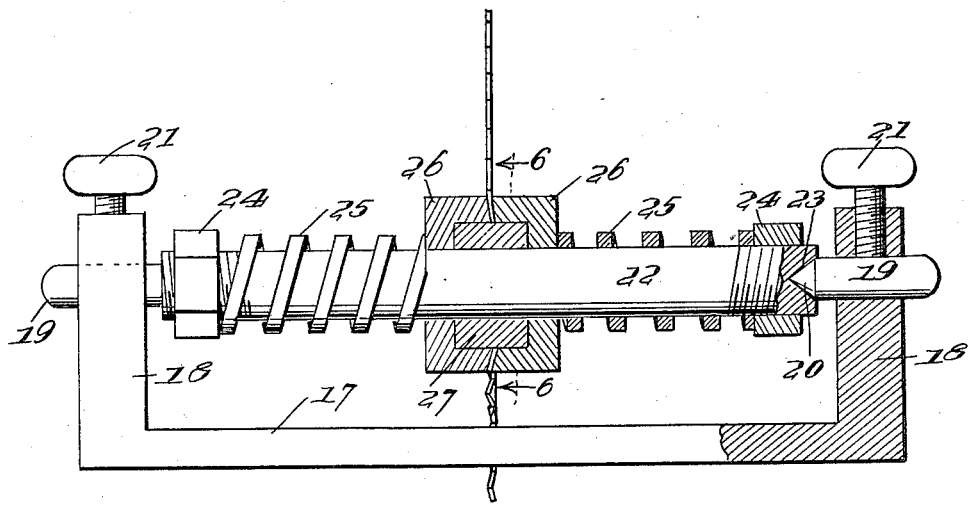
Fig. 5.
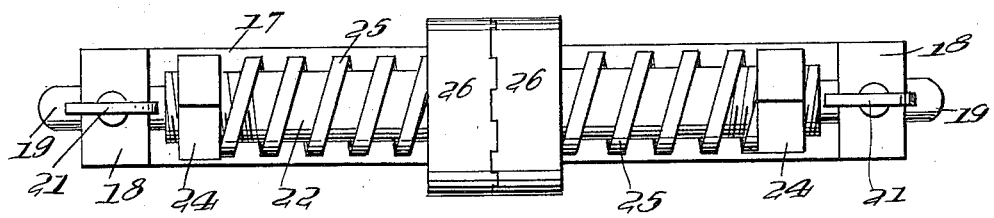
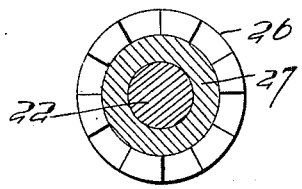
Fig. 6.
Witnesses
Ada C. Hagerty
S. N. Simon
Inventor
Michael J. Lynch
By Joseph A. Miller
Attorney

UNITED STATES PATENT OFFICE.

MICHAEL J. LYNCH, OF NEWPORT, RHODE ISLAND.

AUTOMATIC SAW-SET.

1,092,657. Specification of Letters Patent. Patented Apr. 7, 1914.

Application filed May 15, 1913. Serial No. 767,753.

*To all whom it may concern:*

Be it known that I, MICHAEL J. LYNCH, a citizen of the United States, residing at Newport, in the county of Newport and State of Rhode Island, have invented a new and useful Improvement in Automatic Saw-Sets, of which the following is a specification.

This invention relates to certain new and useful improvements in automatic saw sets and more particularly in devices for setting saw teeth, and the objects thereof are to provide an improved device of this character which is of simplified and economical form, and one in which the setting of the teeth of the saw is accomplished by manually moving the saw between rotary setting devices which simultaneously act on opposite sides of the saw blade.

Figure 1:
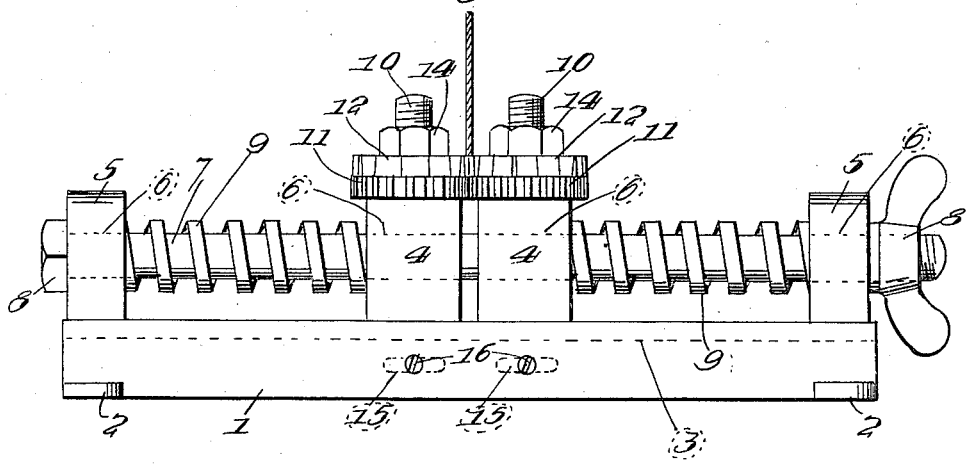
Figure 2:
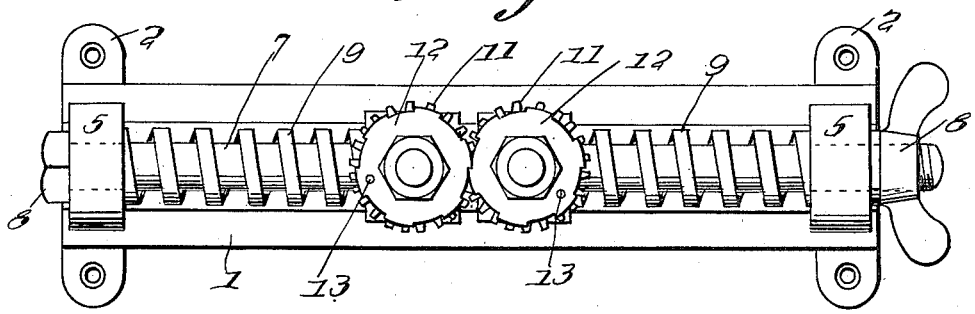
Figure 3:
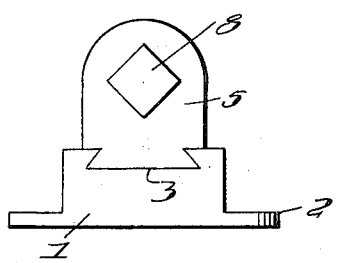

In the drawings—Figure 1 is a side elevation of the invention adapted for use in connection with hand saws. Fig. 2 is a top plan view thereof. Fig. 3 is an end elevation of the left hand end of Fig. 1. Fig. 4 is a side elevation, partly broken away and shown in section of a modified form of the invention for use in connection with hand saws. Fig. 5 is a top plan view of Fig. 4, and Fig. 6 is a section taken on the line 6—6 of Fig. 4.

Referring to Figs. 1 to 3 of the drawings, the setting device therein shown is composed of a bed or base plate 1, which has perforated ears 2 to receive fastening means whereby the base plate may be rigidly secured to a work bench or any other suitable support. The upper face of the bed or base plate is provided with a dove-tailed guide way 3, in which are slidingly mounted a pair of vertically disposed members or uprights 4, which members or uprights carry the saw setting means shortly to be referred to. At each end of the base plate 1 an end support 5 is rigidly secured in the guide way 3, the supports 5 and the members 4 being formed with registering apertures 6 in which a rod 7 is received. The rod 7 is formed with a head 8 on one end thereof, which latter abuts one of the end supports 5, the opposite end of the rod being threaded and equipped with a wing nut 8. Coil springs 9 encircle the rod 7, having their outer ends abutting the end supports 5 and their inner ends abutting the members 4, and since the latter are slidable with respect to the base plate and the rod 7, it will be readily appreciated that the springs will normally tend to cause the members 4 to approach one another. Projecting upwardly, from the top face or ends of each of the members 4, are threaded stubs 10 the stubs rotatably engaging intermeshing gears 11 that seat on the upper faces of the members 4. A circular saw setting disk 12 is rigidly secured in any suitable manner to each of the gears 11, for instance by a pin 13. Nuts 14 are threaded on the stubs 10 and by engagement with the upper faces of the tooth setting disks 12 restrict upward movement of the latter in an obvious manner.

The tooth setting disks are shaped to alternately throw the teeth first on one side and then on the other side of the saw, as is usual in proper setting of the teeth of the same. In order to restrict the extent of sliding movement of the members 4, the same may be provided with grooves 15 in which screws 16 engage, as depicted in Fig. 1 of the drawings.

In operation the saw is placed to have its teeth engaged between the disks 12, and since the latter are under the tension of the springs 9, they are caused to properly set the saw teeth when the saw is moved transversely of the longitudinal axis of the base plate, the setting disks being simultaneously moved, due to the fact that they are carried by the gears 11 which are in mesh.

In Figs. 4 to 6 of the drawings a modification of the invention is illustrated, in which a base plate 17 is formed with end members 18, the latter being transversely bored to receive spindles 19 which latter have cone points 20, and are held rigidly, though adjustably, with respect to the members 18, by means of thumb screws 21. A rod 22 has conical shaped end depressions 23 which receive the cone points of the spindles 19, whereby the rod is supported in a horizontal position. The rod has its ends exteriorly threaded and receives stop nuts 24 thereover, which stop nuts are engaged by coil springs 25 that encircle the rod and have their inner ends abutting the saw teeth setting members 26. The saw teeth setting members 26 are of substantially cup-shape, being perforated to receive the rod 22, the edges of the members 26 being toothed as depicted in Figs. 5 and 6 so as to alternately throw the teeth of a band saw on opposite sides of the latter. A brass roll 27 is rotatably mounted on the rod 22 and is received within the interiors of the members 26, thereby providing a bearing for the latter, and in addition acting as a means of preventing undue inward movement of the band saw during the setting of the teeth of the latter. The operation of this form of the invention is similar to that described in connection with the other form.

Having thus described my invention, I claim as new and desire to secure by Letters Patent;—

1. In a saw setting device, a base element, a pair of circular opposed saw teeth setting members, means to rotatably support said members from the base element, and spring means to exert pressure on each member to cause same to forcibly engage opposite sides of the saw blade.

2. In a saw setting device, a base having a dovetailed guide, perforated end supports in the guides, a rod having its end portions arranged in said perforations of the end supports, a pair of members slidingly arranged in said guide and being perforated to slidingly receive said rod, intermeshing gears rotatably carried on the upper faces of said members, tooth setting disks rigidly secured to the gears and arranged to set the teeth in unison, and a pair of coil springs encircling the rod and arranged between said members and the end supports.

3. In a saw setting device, a base element having a guide, a pair of opposed spring pressed members slidingly mounted on the guide, intermeshing gears on said members, and saw teeth setting disks rigidly connected to said gears and adapted to act in unison on opposite sides of the saw.

In testimony whereof I have signed my name to this specification in the presence of two subscribing witnesses.

MICHAEL J. LYNCH.

Witnesses:
  ADA E. HAGERTY,
  J. A. MILLER.

Copies of this patent may be obtained for five cents each, by addressing the "Commissioner of Patents, Washington, D. C."